United States Patent [19]

Burdick

[11] Patent Number: 5,992,828
[45] Date of Patent: Nov. 30, 1999

[54] ELECTRIC FENCING SYSTEM

[76] Inventor: Brett R. Burdick, 4007 Heather Ct., Knoxville, Tenn. 37919-4217

[21] Appl. No.: 08/989,107

[22] Filed: Dec. 11, 1997

[51] Int. Cl.$^6$ .................................................. A01K 3/00
[52] U.S. Cl. ............................... 256/10; 52/101; 174/139; 256/59; 256/24; 256/63; 403/381
[58] Field of Search ................................ 256/10, 59, 62, 256/63, 65, 68, 69, 24; 403/381; 174/139, 135, 140 R; 52/101

[56] References Cited

U.S. PATENT DOCUMENTS

| | | | |
|---|---|---|---|
| D. 243,342 | 2/1977 | Langlie et al. | D26/10 |
| D. 248,850 | 8/1978 | Berg, Jr. et al. | D13/17 |
| D. 248,851 | 8/1978 | Langlie et al. | D13/18 |
| 2,927,952 | 3/1960 | Wermine | 174/27 |
| 3,223,796 | 12/1965 | Willoughby | 200/61.41 |
| 4,028,489 | 6/1977 | Berg, Jr. et al. | 174/166 R |
| 4,046,356 | 9/1977 | Rose | 256/10 |
| 4,049,905 | 9/1977 | Maranell | 174/163 F |
| 4,070,007 | 1/1978 | Minor et al. | 256/19 |
| 4,111,400 | 9/1978 | Enoksson | 256/47 |
| 4,150,814 | 4/1979 | Warren et al. | 256/10 |
| 4,162,783 | 7/1979 | Crist, Jr. | 256/10 |
| 4,196,890 | 4/1980 | Einhorn | 256/2 |
| 4,263,477 | 4/1981 | Wilson, Sr. | 174/158 F |
| 4,355,201 | 10/1982 | Wilson, Sr. | 174/166 R |
| 4,471,561 | 9/1984 | Lapierre | 174/135 X |
| 4,494,733 | 1/1985 | Olsson | 256/10 |
| 4,531,019 | 7/1985 | Foissner et al. | 174/163 F |
| 4,533,120 | 8/1985 | Ruddock | 256/52 |
| 4,692,567 | 9/1987 | Crum | 174/158 F |
| 4,771,137 | 9/1988 | Thompson | 174/163 F |
| 4,792,254 | 12/1988 | Platten | 403/48 |
| 4,819,914 | 4/1989 | Moore | 256/10 |
| 4,860,996 | 8/1989 | Robbins, III | 256/10 |
| 4,861,645 | 8/1989 | Standing | 428/196 |
| 4,866,218 | 9/1989 | Wilson, Jr. | 174/158 F |
| 4,883,923 | 11/1989 | Langlie et al. | 174/158 F |
| 4,905,956 | 3/1990 | Eby et al. | 256/10 |
| 5,096,162 | 3/1992 | Cleveland | 256/10 |
| 5,163,658 | 11/1992 | Cleveland | 256/10 |
| 5,277,512 | 1/1994 | Dwilles | 403/381 X |
| 5,338,007 | 8/1994 | Hinton | 256/48 |
| 5,461,199 | 10/1995 | Buard | 174/135 X |
| 5,673,517 | 10/1997 | Stanclift | 403/381 X |
| 5,784,841 | 7/1998 | Nowell | 403/381 X |
| 5,850,808 | 12/1998 | Burdick | 52/101 X |

Primary Examiner—Lynne H. Browne
Assistant Examiner—John R. Cothingham
Attorney, Agent, or Firm—Luedeka, Neely & Graham, PC

[57] ABSTRACT

A fencing system including a plurality of vertical support members for supporting a plurality of elongate support members so as to create a physical barrier. A plurality of elongate conductors are attached to the elongate support members and positioned so that the elongate conductors attached to each elongate support member run parallel to the elongate support members. A power supply is connected to the elongate conductors so that an electrical potential is created.

15 Claims, 11 Drawing Sheets

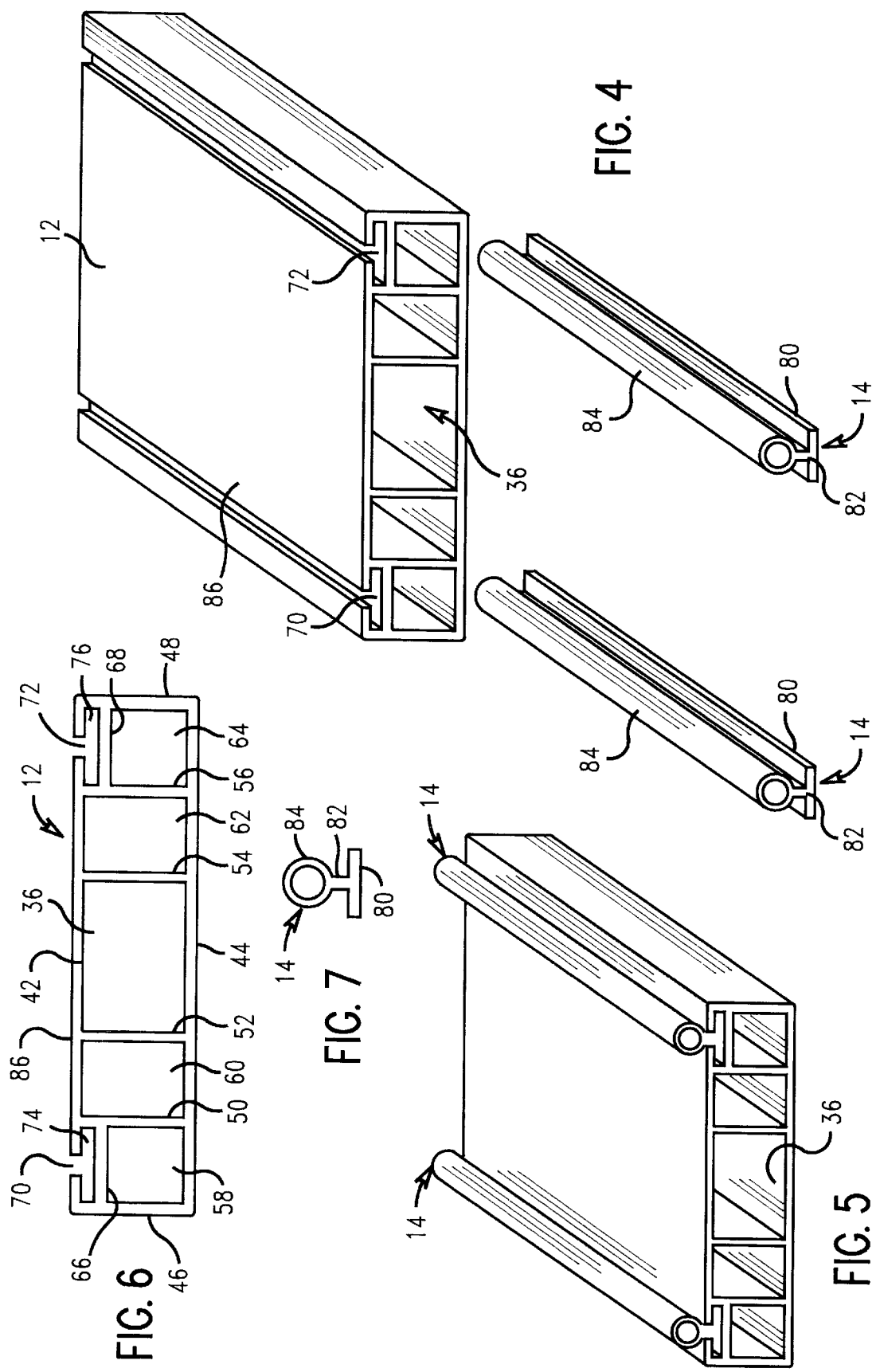

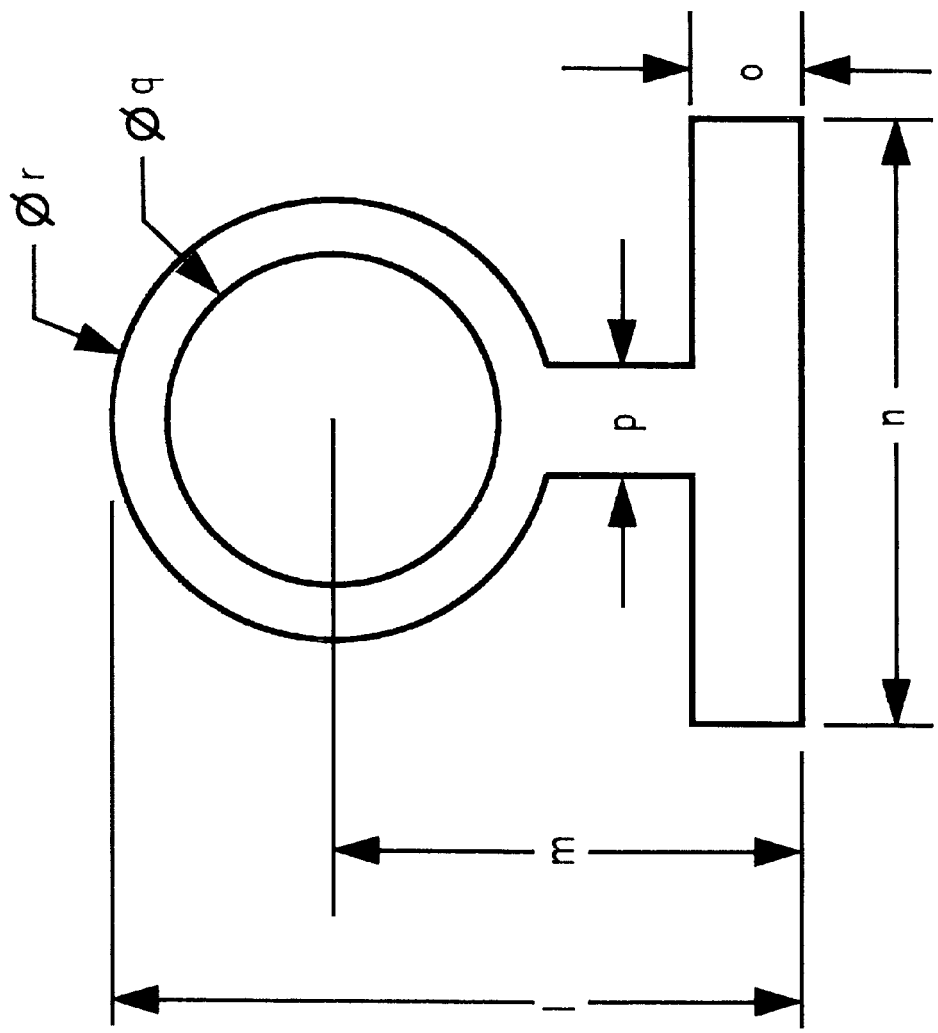

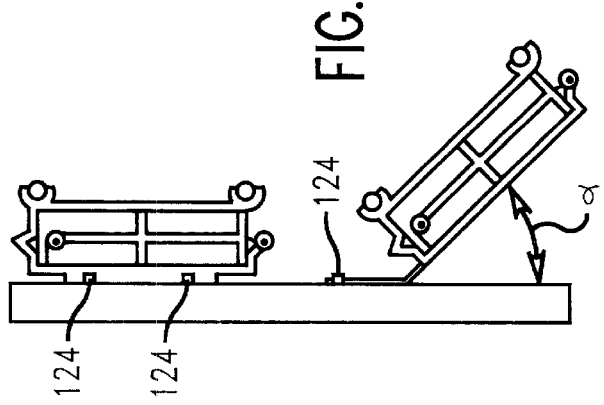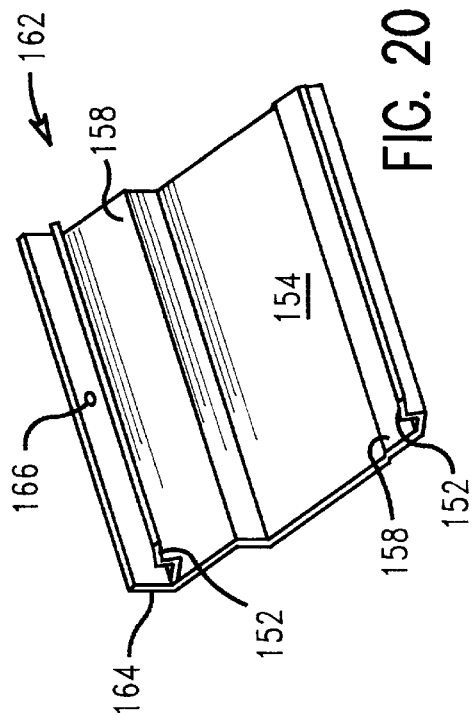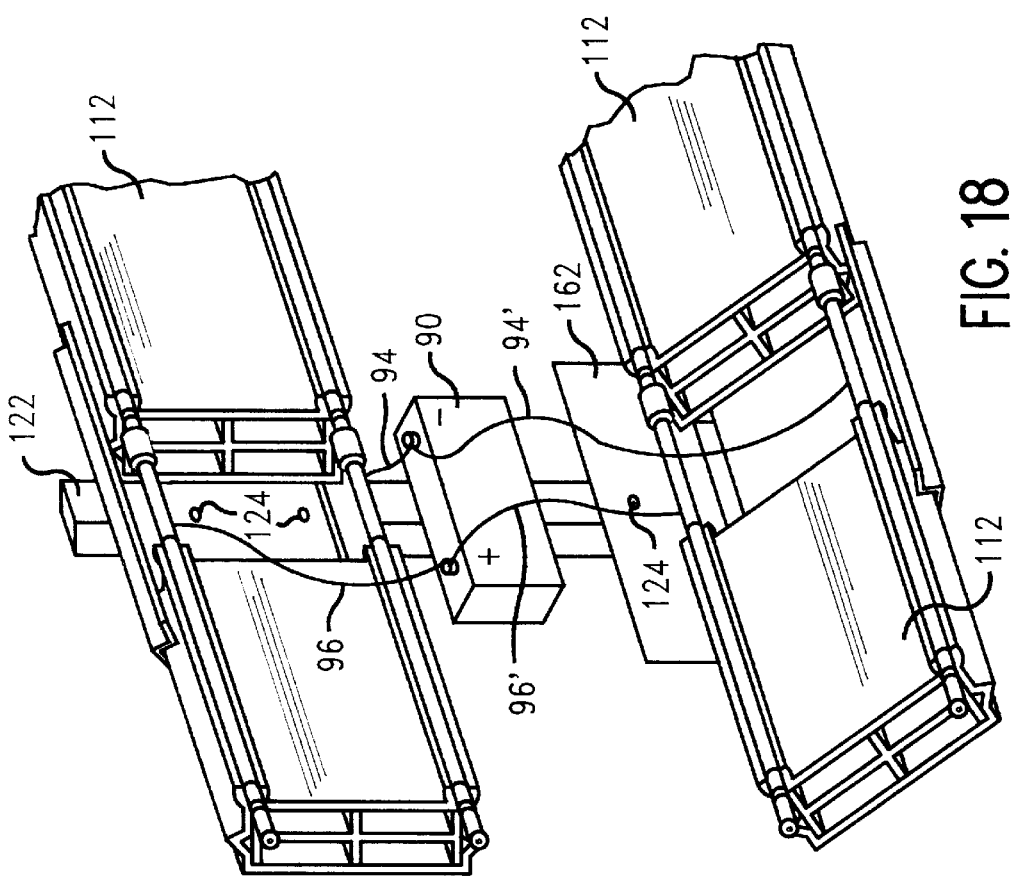

ELECTRIC FENCING SYSTEM

FIELD OF THE INVENTION

This invention relates generally to fencing. More particularly, this invention relates to electrical fencing and to systems for mounting conductors for electrical fences.

BACKGROUND AND SUMMARY OF THE INVENTION

Electric fences are commonly used to enclose farm animals such as cattle. These fences commonly have wires strung between fence posts. The wires themselves are generally not strong enough to contain the animals in the enclosure. To deter the animals from escaping, the wires are electrified to create an electrical potential between two parallel wires or between a wire and the ground. When an animal touches the electrified wire, a current path is created from the electrified wire, through the animal, and to the ground. Similarly, if the system uses two or more wires, a current path is created from an electrified wire, through the animal, and into a ground wire. This current flow shocks the animal and causes an unpleasant sensation that typically causes the animal to avoid the fence. The severity of the shock can be controlled by increasing or decreasing the voltage and current supplied to the conductive wires.

Conventional electric fences have several disadvantages. For example, the wires themselves are generally not very visible or strong and a frightened or angry animal may not see them and may run right through them even though a shock is felt. Similarly, a fallen tree limb may knock down the electrified wires. Conventional systems are also unaesthetically pleasing and are susceptible to failure resulting from breakage due to fatigue of the wires.

In this regard, it has been observed that conventional electric fences often have a limited deterrent effect upon animals because the animals are often unaware of the fence until a shock is received since such electric fences generally consist of nothing more than a wire connected between fence posts. In high grass, these fences are often so concealed that even a person would be unaware of the fence's presence. To an even greater degree, animals tend not to notice the thin wire until a shock is received. Once shocked, the frightened animals are often unable to determine the source of the shock and may flee directly into the fence, thereby damaging or destroying the fence. To increase the visibility of the fences, farmers often tie bright colored pieces of cloth around the wires to increase the fence's visibility. This somewhat improves the visibility of the fence but does not identify the entire length of the fence, and hence the source of the shock to the animals, and otherwise does not overcome the disadvantages of such fences.

Accordingly it is an object of the present invention to provide an improved electric fencing system which avoids many of the disadvantages of conventional electric fences Another object of the invention is to provide an electric fencing system that is highly visible so that animals and people alike are aware of the electrified fence and its precise boundaries.

A further object is to provide a physical barrier having enhanced durability.

Still another object is to provide an electric fence of the character described that is adaptable to mounting in a variety of settings.

An additional object of the present invention is to provide a fencing system of the character described which is uncomplicated in configuration and economical.

Yet another object of the invention is to provide an electric fence of the character described which is more aesthetically pleasing than the prior art electric fences.

Having regard to the foregoing and other objects, the present invention is directed to a fencing system.

According to the invention, the fencing system includes an elongate support provided by an electrically non-conductive material, the support having a front surface opposite and spaced apart from a back surface and at least two spaced apart elongate channels defined in the space between the front and back surfaces with each channel having an elongate slit that is smaller in cross-section than the channel and provided on the front surface thereof to provide access to the channel from the front surface.

At least two elongate conductors attachable to the support are provided, each conductor having an elongate support surface positionable within one of the channels of the support, an elongate contact surface positionable adjacent the front surface of the support and a connecting portion positionable within one of the slits and extending between the support surface of the conductor and the contact surface of the conductor.

A power supply having oppositely charged poles provides electrical power to each conductor, with adjacent ones of the conductors being oppositely charged such that when an animal comes into simultaneous contact with oppositely charged conductors an electronic circuit is completed and an electric current is applied to the animal.

In another aspect, the fencing system includes a plurality of vertical support members for supporting a plurality of elongate support members so as to create a physical barrier. A plurality of elongate conductors are attached to the elongate support members and positioned so that the elongate conductors attached to each elongate support member run parallel to the elongate support members. A power supply is connected to the elongate conductors so that an electrical potential is created.

In an especially preferred embodiment, the elongate conductors are hollow and a first elongate conductor of an elongate support member is electrically connected to a second elongate conductor of an adjacent elongate support member by inserting a connecting conductor partially inside the first conductor and partially inside the second conductor and crimping the first and second conductors around the conductive connector.

A significant aspect of the invention relates to the provision of a fencing system which is highly visible and has improved aesthetics and strength as compared to conventional electric fences.

BRIEF DESCRIPTION OF THE DRAWINGS

The above and other features and advantages of the present invention will become further known from the following detailed description when considered in conjunction with the accompanying drawings in which: For example, the non-conductive supports may be provided in various highly visible colors, such as white, yellow or the like and may be treated to be phosphorescent so as to be visible in the dark. The supports also provide a physical barrier to deter an animal from passing through the fence. These factors combine to alert persons and animals of the presence of the fence and, when a shock is felt by an animal contacting the fence, the fence is sufficiently visible so as to perhaps indicate the source of the shock to the animal and thus visually serve as a deterrent in the future.

FIG. 4 is a perspective view showing components of the system of FIG. 1.

FIG. 5 is a perspective view of the components of FIG. 4 in an assembled state.

FIGS. 6 and 6a are cross sectional end views of one of the components of FIG. 4.

FIGS. 7 and 7a are cross sectional end views of another component of FIG. 4.

FIG. 18 is a perspective view showing the assembly of FIG. 9 mounted to a fence post.

FIG. 19 is a cross sectional end view of the assembly of FIG. 18.

FIG. 20 is a perspective of one of the brackets used in the assembly of FIG. 19.

DETAILED DESCRIPTION

Figure 1:
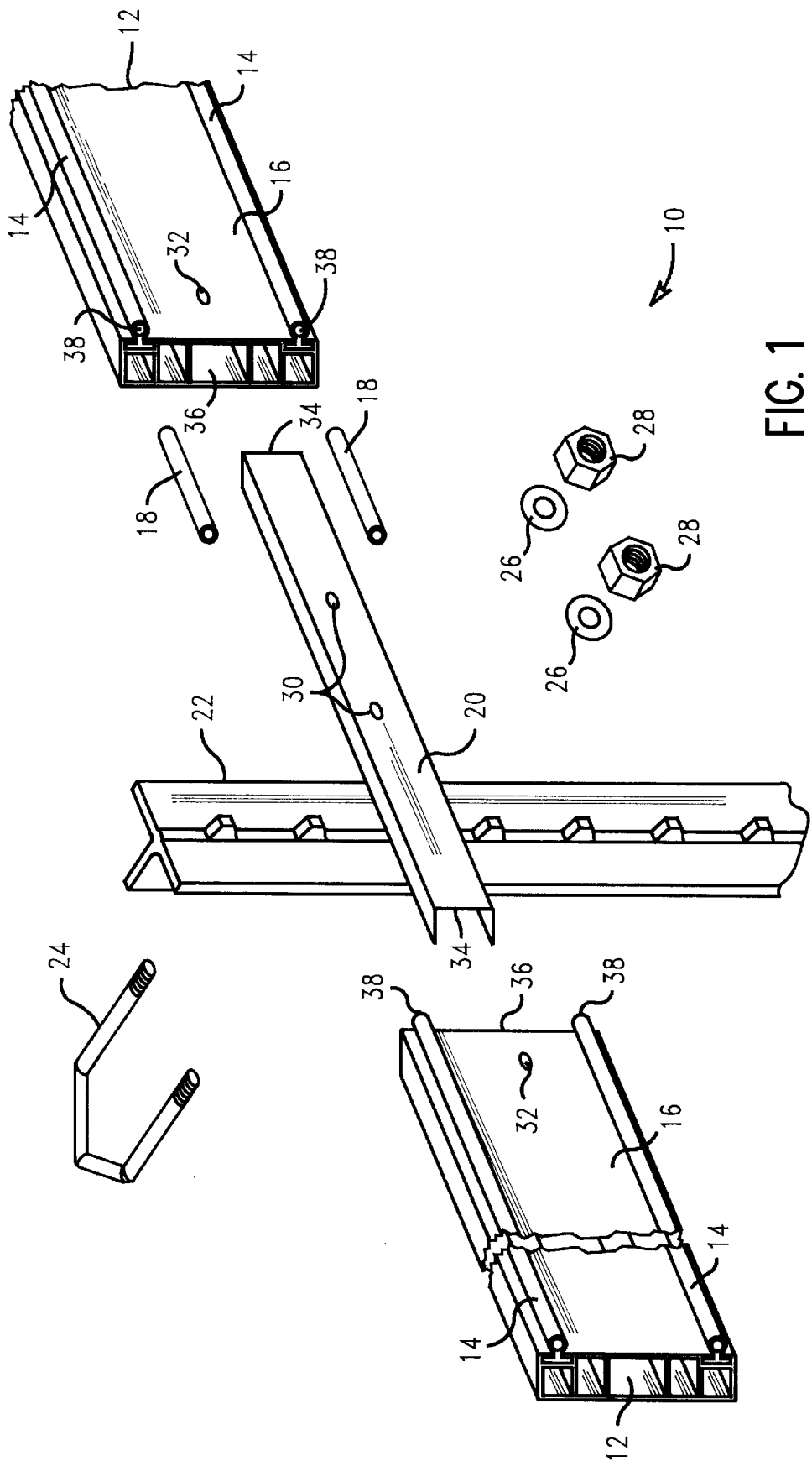
FIG. 1 is an exploded perspective view of a fencing system in accordance with the invention.

With initial reference to FIG. 1, there is shown an electric fencing system 10 in accordance with the present invention. In a preferred embodiment, the electric fencing system 10 includes a series of nonconductive support members 12, each member 12 having one or more generally hollow conductors 14 secured adjacent to a front surface 16 thereof. Conductive connecting rods 18 are preferably provided to electrically connect the conductors 14 of adjacent members and a support brace or connecting member 20 is preferably provided for connecting adjacent support members 12 together and to a support, such as metal post 22 using fasteners such as U-bolt 24 and associated washers 26 and nuts 28, the ends of bolt 24 passing through aligned apertures 30 of the member 20 and apertures 32 of the member 12. The connecting member 20 is preferably provided by a length of PVC or nonconductive material having a generally U-shaped cross-section, a length of from about 6 to about 18 inches, preferably about 8 inches and a wall thickness of from about 1/16 inch to about 3/16 inch.

Figure 2:
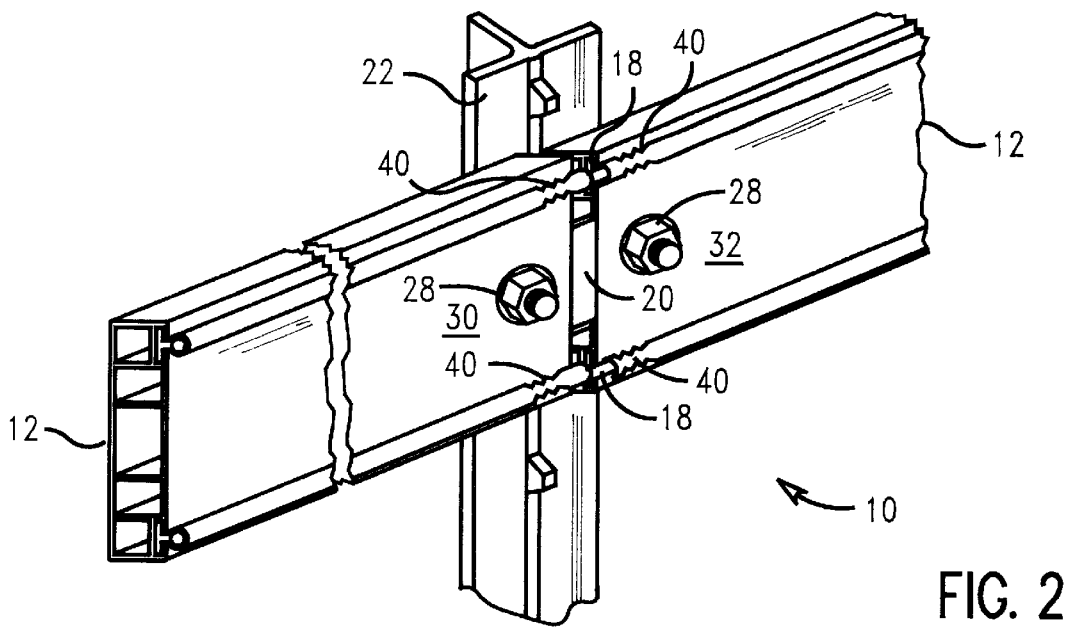
FIG. 2 is a perspective view of the system of FIG. 1 mounted to a metal fence post.

For example, with additional reference now to FIG. 2, there is shown the system 10 installed on the post 22. This may be accomplished, for example, by sliding end 34 of the member 20 into openings or channels 36 provided at the ends of support member 12 until the apertures 30 and 32 are aligned and thereafter passing the free ends of the bolt 24 through the aligned openings, with the bolt surrounding the post 22. Prior to this, the connecting rods 18 are preferably slid into openings 38 of the conductors 14 of one of the members 12. The rods are then, after installation of the bolt 24, extended to span the gap between the adjacent conductors 14 and to pass into the corresponding openings 38 of the adjacent member 12. The rods are crimped into place by compressing hollow conductors 14 around each rod end. The rods 18 will generally stay in place, but their positions may be mechanically fixed, as by the use of adhesive or crimps 40.

Figure 3:
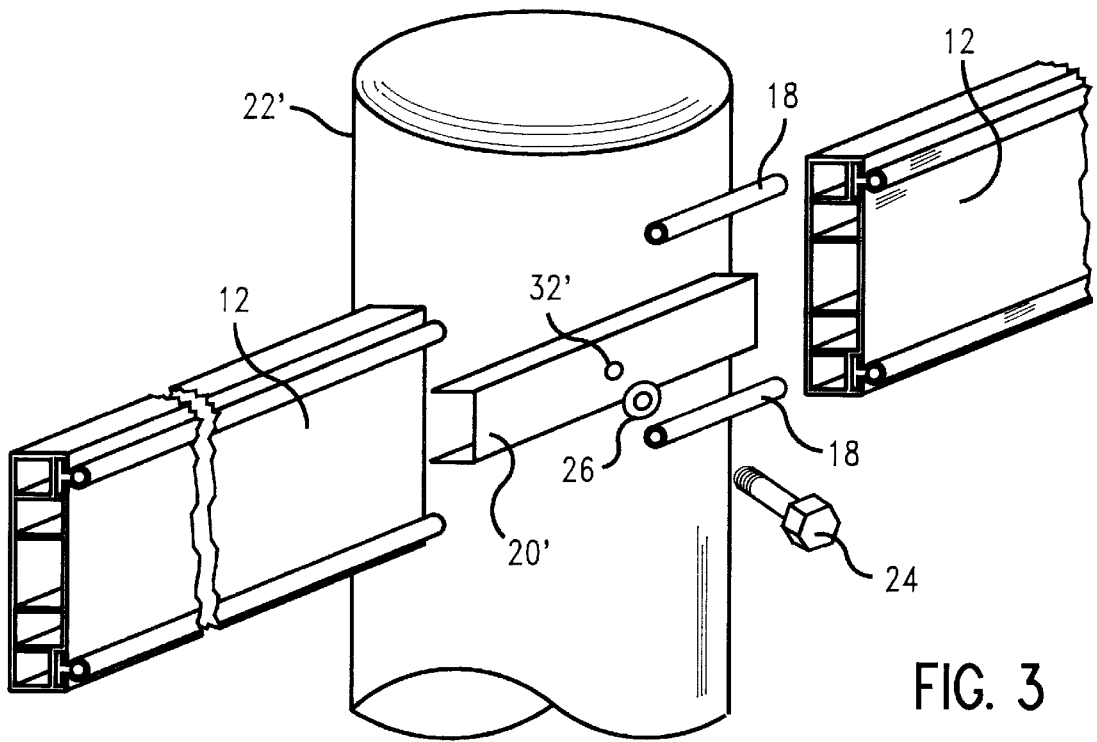
FIG. 3 is an exploded perspective view of another embodiment of a fencing system for mounting to a wooden post.

FIG. 3 shows another embodiment of the invention having a straight fastener 24' and washer 26' for securing the system to a wooden post 22'. In this embodiment, apertures 30 are not provided through the members 12 and only one aperture 32' is provided through the member 20'. As will be appreciated, the fastener 24', such as a wood screw, is preferably screwed directly into the post 22'. As will be appreciated, one, two or more of the horizontal arrays of support members and associated conductors may be mounted on a post, preferably in substantially parallel relationship, to provide a fence system.

Turning now to FIGS. 4–7, each support member 12 is preferably of one-piece construction and made of a non-conductive plastic material, preferably an ultra-violet light inhibited polyvinyl chloride, using extrusion techniques. The support members 12 may be provided in various highly visible colors, such as white, yellow or the like and may be treated to be phosphorescent so as to be visible in the dark.

With reference to FIG. 6, each support member 12 is preferably a generally hollow rectangular shell having an upper wall 42, lower wall 44 and side walls 46 and 48. Reinforcing ribs 50, 52, 54 and 56 extend between the upper wall 42 and the lower wall 44 to define the channel 36 and channels 58, 60, 62 and 64, which run the length of the member 12 and are open on each end. As will be appreciated, the ribs 50–56 provide strength and rigidity to the member and enable a hollow, light-weight construction. The channels 58 and 64 have abbreviated heights defined by cross-ribs 66 and 68 which extend across upper portions of the channels 58 and 64, respectively. That is, rib 66 extends between the sidewall 46 and the rib 50 and rib 68 extends between the sidewall 48 and the rib 56.

The walls 44, 46 and 48 are substantially continuous and flat, as is the wall 42 with the exception that the wall 42 is not continuous adjacent portions of the ribs 66 and 68. The non-continuous portions of the wall 42 define elongate slits 70 and 72 on the upper wall 42. The slits 70 and 72 are smaller in width than are the ribs 66 and 68 such that channels 74 and 76 are formed below the slits 70 and 72, respectively. As explained in more detail below, the channels 74 and 76 are configured to receive portions of the conductors 14 to maintain a contact surface of each conductor 14 adjacent to the outwardly facing surface of the wall 42 in the assembled fence system for contact with an animal.

Figure 6A:
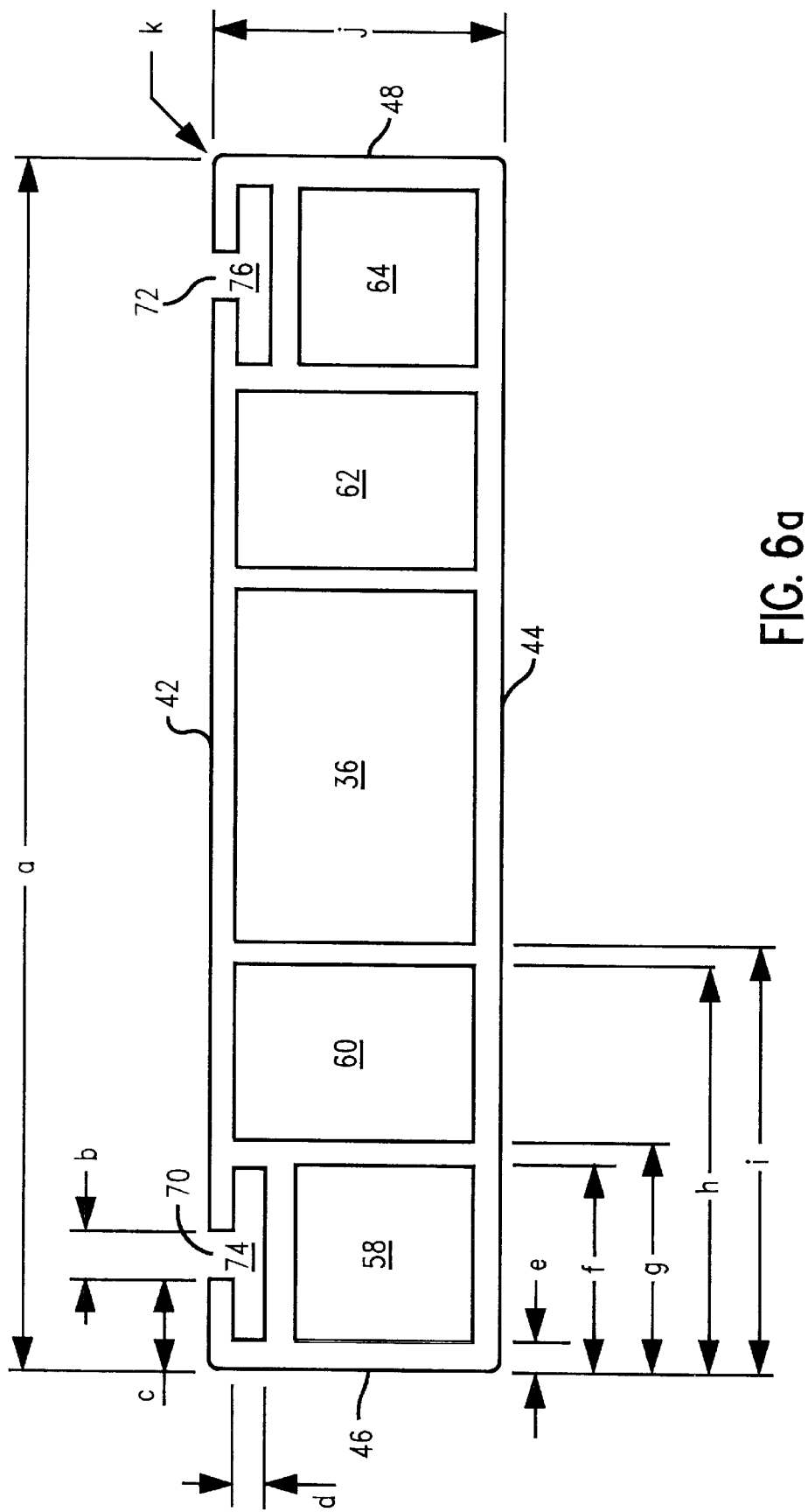

Each member 12 preferably has a length of from about 1 ft to about 12 ft, most preferably from about 6 ft to about 8 ft, and with reference to FIG. 6a is dimensioned as set forth in Table 1, it being understood that the member 12 is substantially symmetrical with the slits 74 and 76 being identical to one another, the channels 58 and 64 being identical and the channels 60 and 62 being identical. The dimensions of Table 1 are provided for the purpose of example only, it being understood that the member 12 may be provided in various other dimensions.

TABLE 1

| Dimension | Distance (in.) |
| --- | --- |
| a | 3.00 |
| b | 0.09 |
| c | 0.20 |
| d | 0.10 |
| e | 0.065 |
| f | 0.48 |
| g | 0.52 |
| h | 0.99 |
| I | 1.04 |
| j | 0.72 |
| k | 0.03 (radius) |

With reference to FIG. 7, each conductor 14 is preferably of one-piece construction made of a conductive material such as aluminum or copper and includes a support surface 80 configured to be fittingly received within the channel 74 or 76, a connecting portion 82 sized to fit within one of the slits 70 or 72 and a contact surface 84 which is positionable adjacent to outwardly facing surface 86 of the wall 42 in the assembled fence system for contact with an animal.

In a preferred embodiment, each conductor 14 is preferably the same length as the support 12 and each contact surface 84 substantially hollow and cylindrical in shape, with the ends being open to receive the rods 18 (FIG. 1). With reference to FIG. 7a, each conductor 14, for the purpose of an example, is preferably dimensioned as set forth in Table 2:

TABLE 2

| Dimension | Distance (in.) |
| --- | --- |
| l | 0.43 |
| m | 0.30 |
| n | 0.38 |
| o | 0.075 |
| p | 0.075 |
| q | 0.19 (Ø) |
| r | 0.27 (Ø) |

With additional reference to FIGS. 4 and 5, the conductors 14 may be positioned on the members 14 by, for example, sliding support surface 80 into the channel 74 (or 76) such that the connecting portion 82 extends out of the slit 70 (or 72) and the contact surface 84 is adjacent the outer surface 86 of the member 12 as shown in FIG. 5.

Figure 8:
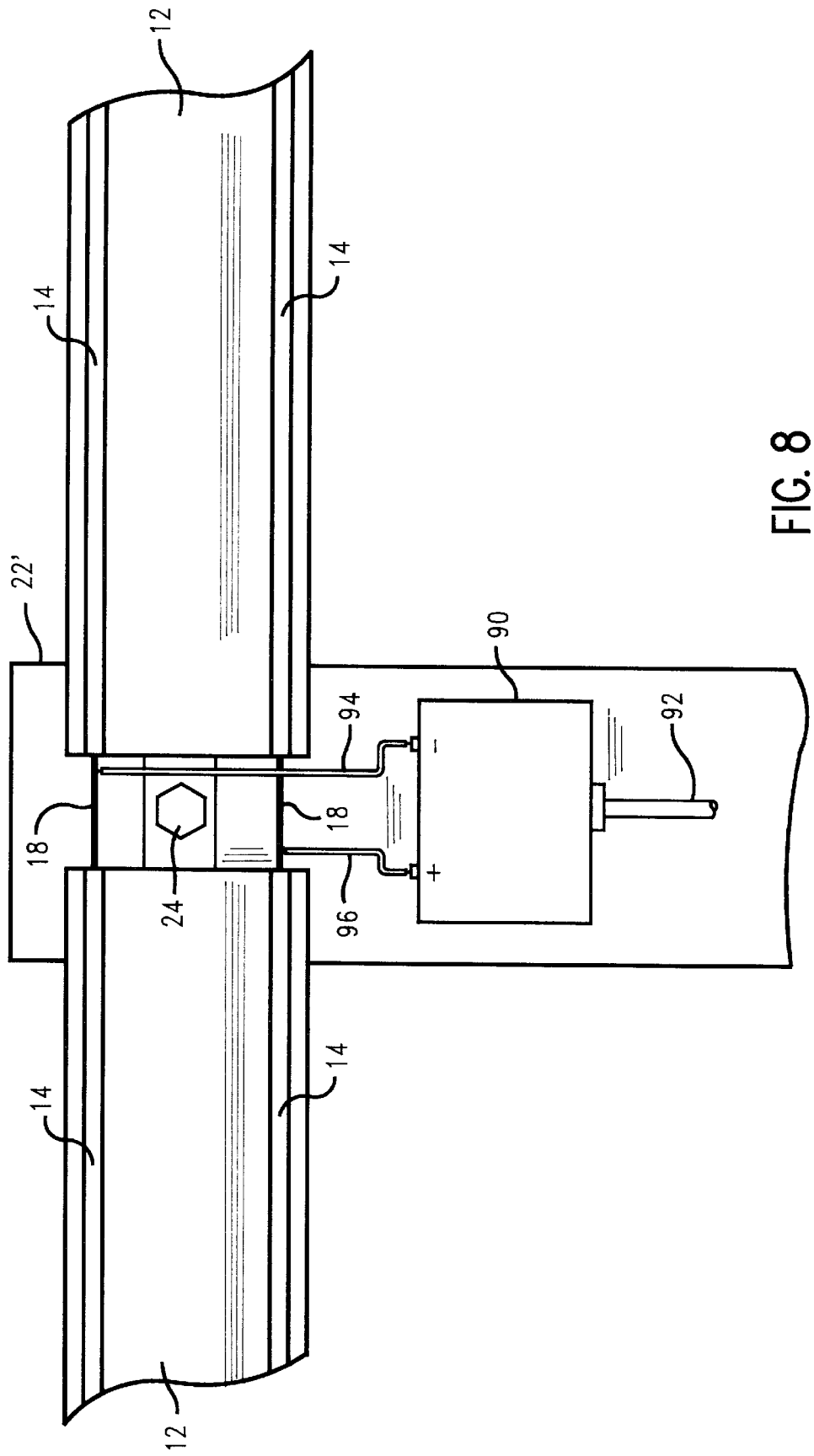
FIGS. 8 and 8a are pictorial representations of a power supply connected to the fencing system of FIG. 3.
Figure 8A:
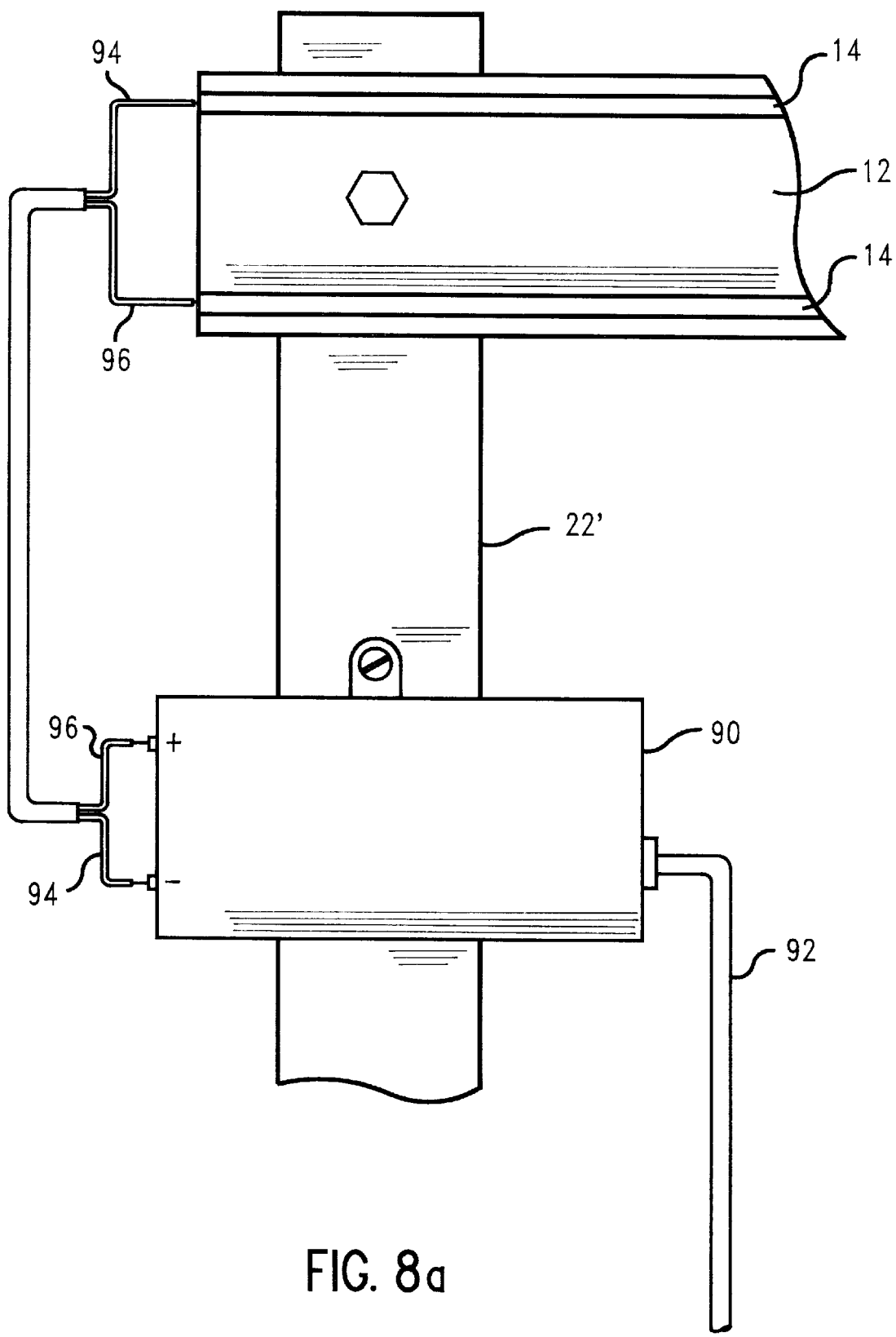

Turning to FIGS. 8 and 8a, electrical power may be supplied to the power supply 90 connectable to a standard 110 VAC outlet as by cord 92. The power supply 90 may be connected to the fencing system as by leads 94 and 96 associated with opposite poles of the power supply being connected to opposite ones of the conductors 14 by crimping ends of leads 94 and 96 into hollow ends of hollow conductor 14 or otherwise connecting the leads to the conductors 14 or the connecting rods 18.

The power supply 90 is preferably a power supply available under the trade name SURE SHOCK CONTROLLER (Model SS-1000) from Fi-Shock Inc. of Knoxville, Tenn. and having a nominal output voltage of about 12,000 VAC intermittent with a nominal maximum short-circuit output current of about 1A. Other suitable power supplies include a solar powered power supply available under the tradename SOLAR SHOCK (Model SS-440) from Fi-Shock Inc. and having a nominal output voltage of about 7,500 VDC intermittent with a nominal maximum short-circuit current of about 3 amps.

Figure 9:
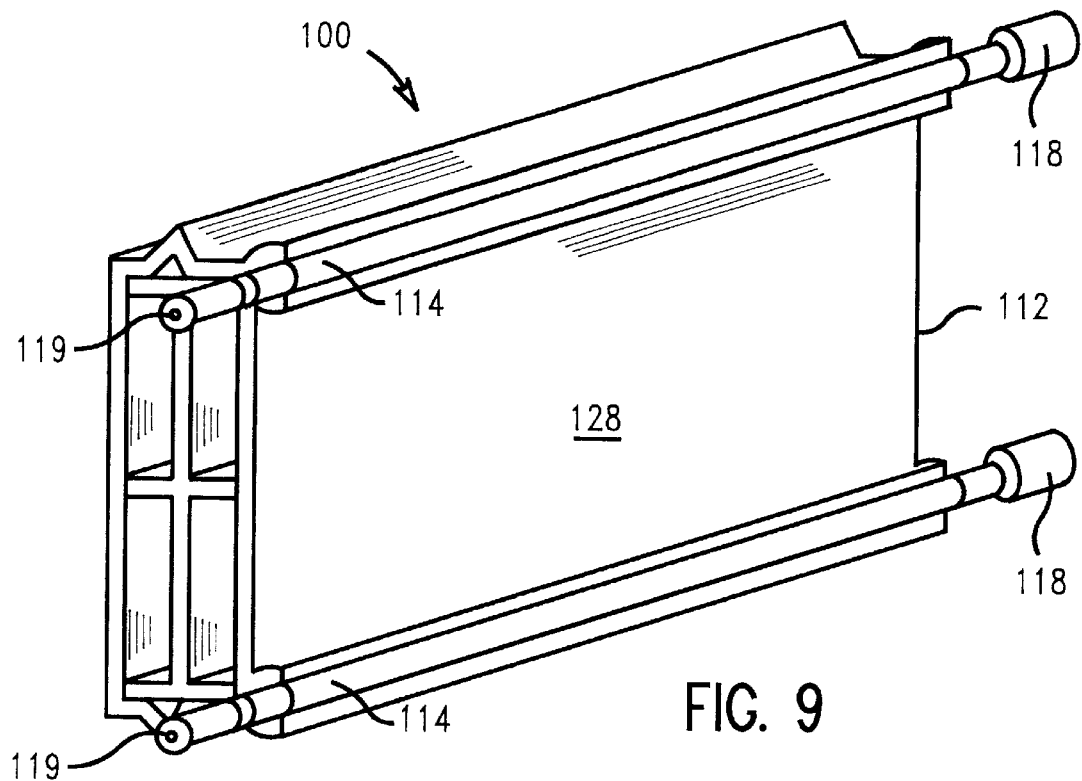
FIG. 9 is a perspective view of an alternate embodiment of a fencing system in accordance with the invention.
Figure 10:
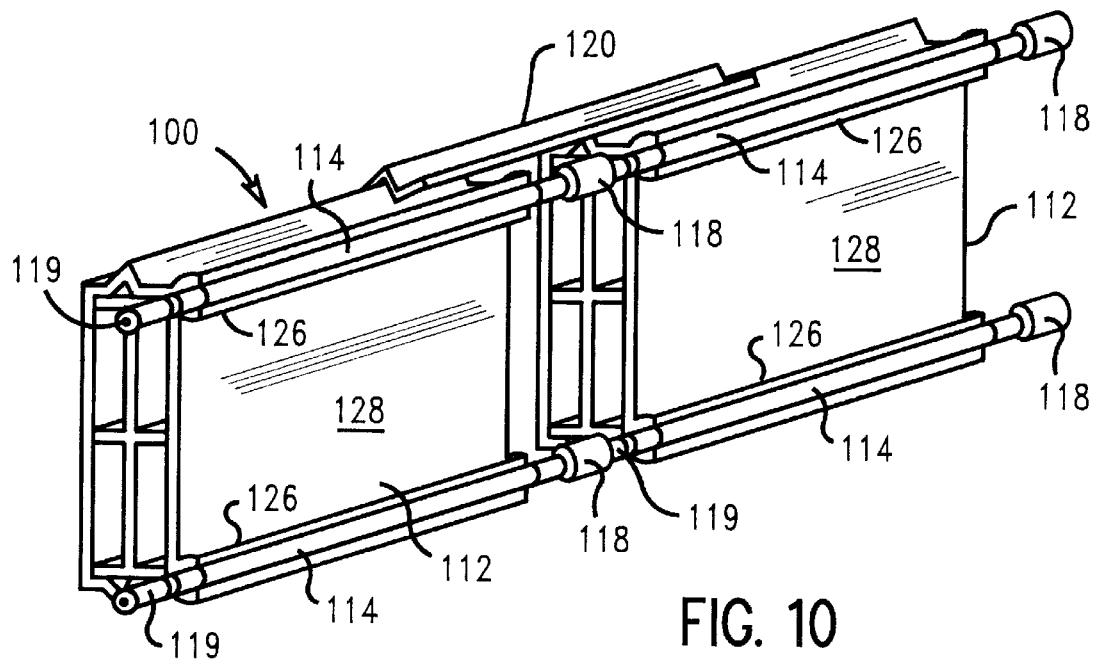
FIG. 10 is a perspective view showing a pair of the assembles of FIG. 9 joined together.

Turning now to FIGS. 9 and 10, there is shown another embodiment of a fence system 100 in accordance with the invention. In a preferred embodiment, the electric fencing system 100 includes a series of nonconductive support members 112, each member 112 having one or more conductors 114 secured adjacent to a front surface 116 thereof. Mating female connectors 118 and male connectors 119 are preferably provided to electrically connect the conductors 114 of adjacent members and a bracket 120 is preferably provided for connecting adjacent support members 112 together and to a support, such as post 122 using fasteners such as screws 124 (FIG. 18). A power supply, such as the power supply 90 may be connected to the system 100 as by leads 94, 94' and 96, 96' by wrapping the leads around the conductors 114 (FIG. 18). The system 100 is preferably provided in the same lengths as described in connection with system 10.

The conductors 114 are preferably provided by lengths of bare conductive wire, such as aluminum or copper or other electrically conductive material. A preferred wire is a 9 AWG aluminum wire. The support members 112 preferably include clip members 126 for maintaining the conductors 114 adjacent an outwardly facing front 128 of the support member 112. The clip members 126 are preferably circular troughs having raised sidewall which are sized to inwardly bias against and grip a conductor 114 inserted therein. This tight fit also serves to deter moisture and debris, i.e., dirt, leaves and the like, from entering the trough.

Figure 11:
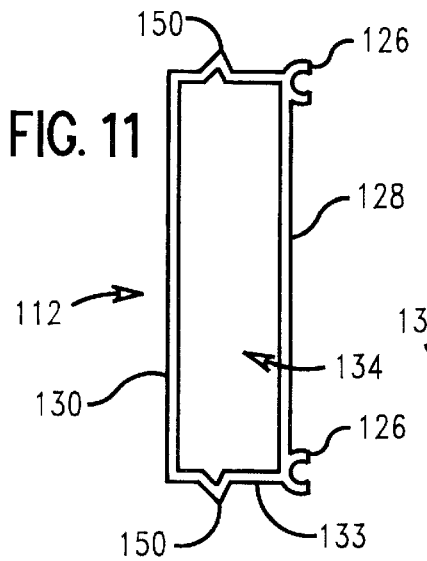
FIGS. 11 and 11a are cross sectional views of a component of the assembly of FIG. 9.
Figure 12:
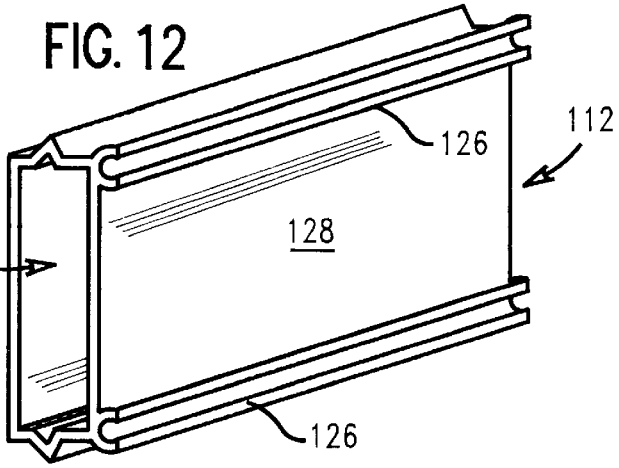
FIG. 12 is a perspective view of the component of FIG. 11.
Figure 13:
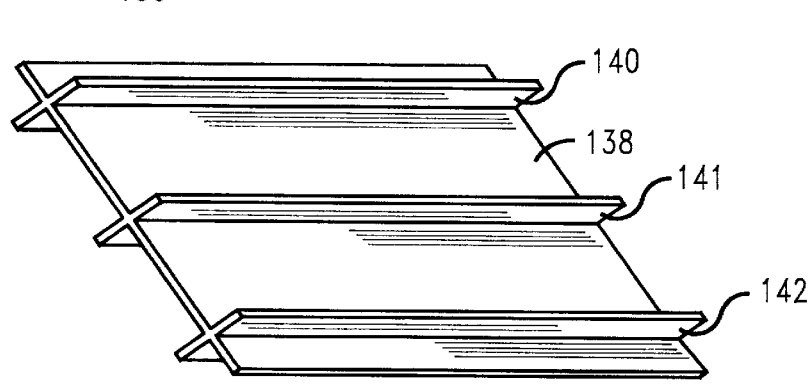
FIG. 13 is a perspective view of a component of the assembly of FIG. 9.
Figure 14:
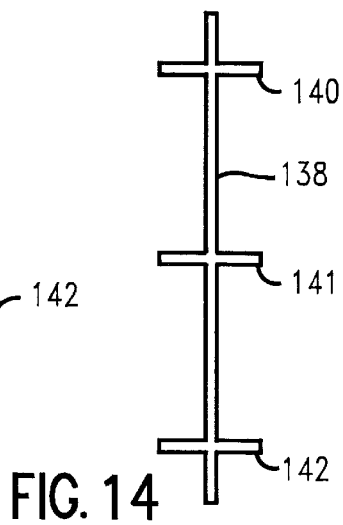
FIG. 14 is a cross sectional end view of the component of FIG. 13.
Figure 15:
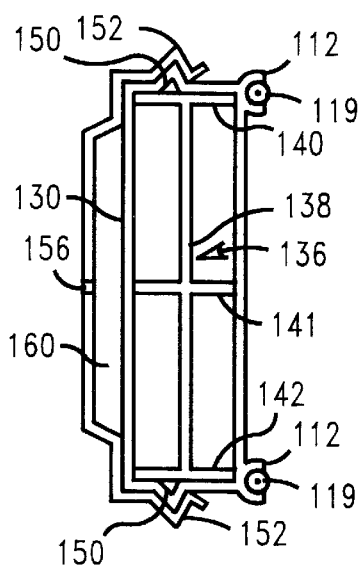
FIG. 15 is a cross sectional end view of a mounting bracket receiving the assembly of FIG. 9.

With reference to FIG. 11, each support member also preferably includes a substantially flat back 130 and identical sidewalls 132 and 133 connecting the back and front of the member 112 so that the front and back are spaced apart to provide a hollow channel 134 into which is fittingly inserted a rigid core 136 (FIGS. 13–15). The core 136 preferably includes a central spine 138 having cross-ribs 140, 141 and 142.

Each support member 112 is preferably of one-piece construction and made of a non-conductive plastic material, preferably an ultra-violet light inhibited polyvinyl chloride, using extrusion techniques. The support members 12 may be provided in various highly visible colors, such as white, yellow or the like and may be treated to be phosphorescent so as to be visible in the dark. The core 136 is preferably provided by a strong, light-weight material, such as aluminum. The core 136 serves as a spine to the outer skin provided by the support member 112.

Table 3 provides, for the purpose of an example, preferred dimensions of the support members 112:

TABLE 3

| Dimension | Distance (in.) |
| --- | --- |
| t | 2.88 |
| u | 0.06 |
| v | 0.12 (Ø) |
| w | 0.25 (Ø) |
| x | 2.89 |
| y | 3.00 |
| z | 0.71 |
| aa | 0.81 |
| bb | 0.02(radius) |
| cc | 0.04 |
| dd | 0.02(radius) |

Figure 16:
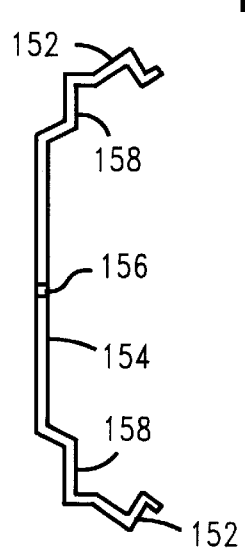
FIG. 16 is a cross sectional end view of the bracket of FIG. 15.
Figure 17:
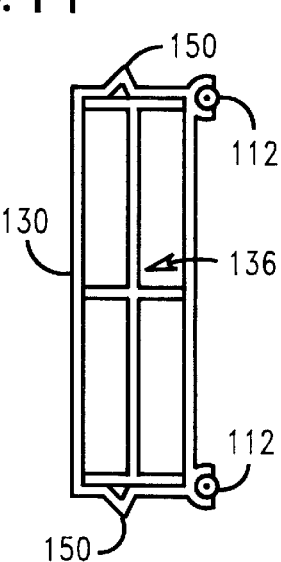
FIG. 17 is a cross sectional end view of the assembly of FIG. 9.
Figure 11A:
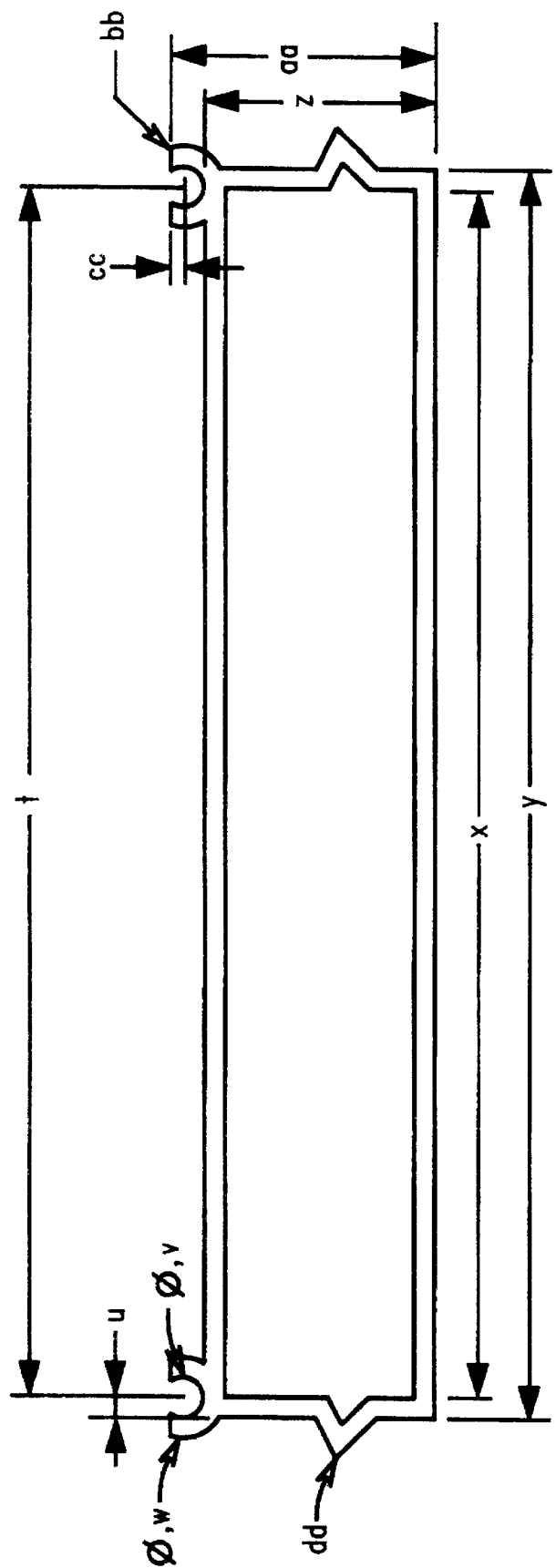

Turning to FIGS. 15–17, FIG. 15 shows the member 112 outfitted with the core 136 and conductors 114 grippingly received by the mounting bracket 120. In this regard, it is noted that the bracket 120 is preferably of one piece construction, preferably of aluminum having a thickness of from about 1/16 inch to about 3/16 inch and is sized so that the member 112 snaps into the bracket 120 for frictional retention thereof. Removal may be accomplished by exerting a force to unsnap the member 112 from the bracket.

In this regard, the sidewalls 132 and 133 of the member 112 each preferably include upstanding ears 150 for engaging bends 152 formed on the bracket 120 to provide a snap-fit. A flat back 154 is provided on the bracket 120 for mounting of the bracket 120 to a post, with one or more apertures 156 provided through the back 154 for inserting fasteners, such as screws 124 (FIG. 18) for mounting of the bracket. To provide clearance for the fasteners, intermediate portions 158 are provided between the bends 152 and the back 154 for engaging the back 130 of the member 112 to provide a space 160 when the member 112 is snapped in the bracket 120.

FIGS. 18 and 19 show the bracket 120 and support 112 fitted with conductors mounted to the post 122. As will be noted, a second bracket 162 is provided at the lower end of the post 120 for positioning the support 112 and conductors at an angle α relative to the post 122, with the angle α preferably being of from about 30 degrees to about 70 degrees, most preferably about 45 degrees. The bracket 162 is substantially identical to the bracket 120, except that the bracket is not mounted by way of the back 154, but instead includes an L-shaped portion 164 having a mounting aperture 166. The smaller leg of the L-shaped portion is preferably an extension of one of the intermediate portions 158.

The foregoing description of certain embodiments of the present invention has been provided for purposes of illustration only, and it is to be understood that numerous modifications or alterations may be made without departing from the spirit and scope of the invention as defined in the following claims.

What is claimed is:

1. A fencing system comprising:
   an elongate support provided by an electrically non-conductive material, the support being substantially rigid and linearly oriented and having a front surface opposite and spaced apart from a back surface and at least two spaced apart elongate channels defined in the space between the front and back surfaces with each channel having an elongate slit that is smaller in cross-section than the channel and provided on the front surface thereof to provide access to the channel from the front surface;
   at least two elongate conductors nondestructably removably attachable to the support, each conductor having an elongate support surface nondestructably removably positionable within one of the channels of the support, an elongate contact surface spaced apart from the support surface and positionable adjacent the front surface of the support and a connecting portion positionable within one of the slits and extending between the support surface of the conductor and the contact surface of the conductor; and
   a power supply having oppositely charged poles for providing electrical power to each conductor, with adjacent ones of the conductors being oppositely charged such that when an animal comes into simultaneous contact with oppositely charged conductors an electronic circuit is completed and an electric current is applied to the animal.

2. The system of claim 1, wherein the non-conductive material of the supports comprises a plastic material.

3. The system of claim 1, wherein the front surface of each support is substantially flat.

4. The system of claim 1, wherein each support has at least one open end to which the channels and their associated slits extend to so that the conductors may be slidably positioned adjacent the support by slidably inserting the support surface and connecting portion of each conductor into its respective channel and slit through the open end of the support.

5. The system of claim 1, wherein each channel is substantially rectangular in cross-section with the largest dimension of each channel being substantially parallel to the front surface of the support.

6. The system of claim 5, wherein the support surface of each conductor is substantially rectangular in cross-section and configured to be slidably received within one of the channels.

7. The system of claim 1, wherein the contact surface of each conductor is substantially circular in cross section.

8. The system of claim 1 wherein the elongate conductors are hollow and a first elongate conductor of an elongate support member is electrically connected to a second elongate conductor of an adjacent elongate support member by inserting a connecting conductor partially inside the first conductor and partially inside the second conductor and crimping the first and second conductors around the conductive connector.

9. The system of claim 1 further comprising a second set of elongate support members connected to vertical support members with a bracket that angles the side of the second set of elongate support members attached to the elongate conductors upward.

10. A system for mounting conductors for repelling an animal, the system comprising:
    an elongate support provided by an electrically non-conductive material, the support being substantially rigid and linearly oriented and having a front surface and at least two spaced apart elongate channels defined adjacent the front surface with each channel having an elongate slit that is smaller in cross-section than the channel to provide access to the channel from the front surface;
    at least two elongate conductors nondestructably removably attachable to the support, each conductor having an elongate support surface nondestructably removably positionable within one of the channels of the support, an elongate contact surface spaced apart from the support surface and positionable adjacent the front surface of the support and a connecting portion positionable within one of the slits and extending between the support surface of the conductor and the contact surface of the conductor; and
    a power supply having oppositely charged poles for providing electrical power to each conductor, with adjacent ones of the conductors being oppositely charged such that when an animal comes into simultaneous contact with oppositely charged conductors an electronic circuit is completed and an electric current is applied to the animal.

11. The system of claim 10, wherein the non-conductive material of the support comprises a plastic material.

12. The system of claim 10, wherein the front surface of each support is substantially flat.

13. The system of claim 10, wherein each support has at least one open end to which the channels and their associated slits extend to so that the conductors may be slidably positioned adjacent the support by slidably inserting the support surface and connecting portion of each conductor into its respective channel and slit through the open end of the support.

14. The system of claim 10, wherein each channel is substantially rectangular in cross-section with the largest dimension of each channel being substantially parallel to the front surface of the support.

15. The system of claim 14, wherein the support surface of each conductor is substantially rectangular in cross-section and configured to be slidably received within one of the channels.

* * * * *